United States Patent [19]
Schmidt et al.

[11] Patent Number: 5,382,636
[45] Date of Patent: Jan. 17, 1995

[54] INTERNALLY PLASTICIZED VINYL CHLORIDE POLYMERS AND PROCESS FOR THEIR MANUFACTURE

[75] Inventors: Frank Schmidt, Essen; Neidhard Gardiewski, Gelsenkirchen-Buer, both of Germany

[73] Assignee: Huels Aktiengesellschaft, Marl, Germany

[21] Appl. No.: 104,946

[22] Filed: Aug. 12, 1993

Related U.S. Application Data

[63] Continuation of Ser. No. 866,578, Apr. 10, 1992, abandoned.

[30] Foreign Application Priority Data

Apr. 10, 1991 [DE] Germany .............................. 4111628

[51] Int. Cl.$^6$ .......................................... C08F 283/02
[52] U.S. Cl. .................................. 525/412; 525/415; 525/186
[58] Field of Search ........................ 525/412, 415, 186

[56] References Cited

U.S. PATENT DOCUMENTS

| | | | |
|---|---|---|---|
| 4,826,934 | 5/1989 | Malfroid | 525/412 |
| 5,003,038 | 3/1991 | Malfroid | 525/412 |

FOREIGN PATENT DOCUMENTS

| | | | |
|---|---|---|---|
| 161419 | 9/1984 | Japan | 525/412 |
| 090208 | 5/1985 | Japan . | |
| 062547 | 3/1986 | Japan . | |

*Primary Examiner*—David Buttner
*Attorney, Agent, or Firm*—Oblon, Spivak, McClelland, Maier, & Neustadt

[57] ABSTRACT

An internally plasticized vinyl chloride polymer with a polycaprolactone content ranging from 32 to 40% is prepared by polymerizing vinyl chloride in the presence of polycaprolactone. The graft copolymers show good transparency, homogeneity, and processing properties.

The copolymers of the present invention can be used to produce materials used in medical applications, such as, blood bags and dialysis tubing.

7 Claims, No Drawings

INTERNALLY PLASTICIZED VINYL CHLORIDE POLYMERS AND PROCESS FOR THEIR MANUFACTURE

This application is a Continuation of application Ser. No. 07/866,578, filed on Apr. 10, 1992, now abandoned.

BACKGROUND OF THE INVENTION

1. Field of the Invention

The field of the present invention pertains to novel plasticized vinyl chloride polymers obtained by polymerizing vinyl chloride in the presence of polycaprolactone and methods for producing such polymers.

2. Discussion of the Background

The conventional processes for plasticizing vinyl chloride polymers (PVC) consist of homogeneously blending vinyl chloride polymers with high-boiling organic compounds. Plasticizers of this kind are called "external" plasticizers and result in undesired characteristics, such as odor, turbidity, exudation, stiffening and similar properties in the foils, films or molded parts constructed from the plasticized polymers. These drawbacks arise from the volatility of the plasticizer itself or from the tendency of the plasticizer to diffuse to the surface of the thermoplastic melt. Typical examples of such plasticizers are dioctyl phthalate (DOP), diisononyl adipate or esters of trimellitic acid (cf. "Encyclopedia of PVC", Marcel Dekker, Inc., New York, 1976). Consequently, the use of such plasticized vinyl chloride polymers in demanding applications, such as are found in the medical sector (e.g., blood bags, catheter tubes, etc.), has been problematic.

The migration tendency of these monomeric plasticizers can be diminished by employing higher molecular compounds. However, such plasticizers exhibit reduced plasticizer efficiency as a consequence of their restricted mobility in the PVC matrix. Their incorporation causes additional problems, as well (C. F. Hammer in "Polymer Blends", Academic Press, New York 1978, vol. 2). With increasing molecular weight of the plasticizer, another phenomenon becomes more noticeable - a growing incompatibility of the resultant polymer blends is usually observed, which is evident from the diminished transparency of the molded parts.

Ethylene-vinyl acetate copolymers are high molecular weight polymers which demonstrate this problem in the vinyl chloride polymer system. With a high vinyl acetate content, the molded parts are transparent but stiff; on the other hand, with a high ethylene content, plasticized but cloudy molded parts are obtained.

By introducing additional carbonyl groups in the form of terpolymers of ethylene, vinyl acetate and carbon monoxide, the compatibility can be increased and transparent materials can be obtained. However, the use of such polymers, which possess very small diffusion coefficients, require technically complicated mixing procedures with comparatively long processing times.

Alternatively, polyesters having a ratio of $CH_2/COO$ of 4–5 to 1 are compatible with vinyl chloride polymers. Polycaprolactone (PCL) is a member of this group (J. V. Koleske in "Polymer Blends", Academic Press, New York, 1978, vol. 2). Its applicability, however, has been limited to blends with PCL concentrations of up to approximately 35%, since at higher concentrations the tendency of caprolactones to crystallize impairs the desired low temperature characteristics and the transparency (D. Hardt, C. Suling, C. Lindner, and L. Morbitzer, Angew. Chem. 94 (1982), 159–169, and R. Deanin, Journal of Vinyl Technology, March 1984, vol. 6, no. 1). Moreover, processing problems persist here, as a result of the high molecular weight of the plasticizer. Consequently, streaks and unopened fish eyes are common in pressed sheets constructed from such blends.

From the above description, it is apparent that there existed a pressing need for a plasticized vinyl chloride polymer which did not suffer from plasticizer diffusion, incompatability, and crystallinity.

SUMMARY OF THE INVENTION

Accordingly, one object of the present invention is to provide a novel plasticized vinyl chloride polymer.

Another object of the present invention is to provide a novel plasticized vinyl chloride polymer which possesses the workability, flexibility and distensibility characteristics of plasticized PVC, without the concommittant problems of plasticizer diffusion, incompatibility, crystallinity, opacity and difficulty of processing.

Another object of the present invention is to provide a novel plasticized vinyl chloride polymer in which the vinyl chloride is polymerized in the presence of polycaprolactone.

Another object of the present invention is to provide a novel method for preparing a plasticized vinyl chloride polymer.

Another object of the present invention is to provide a novel method for preparing a plasticized vinyl chloride polymer in which the vinyl chloride is polymerized in the presence of polycaprolactone.

Applicants have surprisingly found that the polymerization of vinyl chloride in the presence of polycaprolactone results in a novel plasticized vinyl chloride polymer which enjoys the benefits of plasticized PVC without suffering the disadvantages that have characterized plasticized blends of PVC. For example, the present invention permits the use of higher concentrations of polycaprolactone with its concommitant effect on its plasticity characteristics, e.g., lower Shore A hardness. Yet, the graftcopolymerized plasticized PVC of the present invention produces simple-to-process products that exhibit better transparency and homogeneity than the plasticized blends of the prior art which are prepared from homopolymers.

Applicants have found a novel internally plasticized vinyl chloride polymer which can be processed into finished parts having superior transparency and excellent stability to extraction. This plasticized PVC is produced by polymerizing vinyl chloride in the presence of polycaprolactone to provide a product which has a polycaprolactone content of 32% to 40% by weight, preferably from 35 to 39% by weight.

These graft copolymers can be characterized as "internally plasticized" vinyl chloride polymers in which the plasticizer is constrained from migrating as a result of the linking of the vinyl chloride polymer chain to the polycaprolactone. This contrasts sharply with the blends of the prior art, as is demonstrated in Table 1, where the extractable portion of the present polymer is less than and the precipitable percentage is greater than the plasticized PVC of the prior art.

Preferably such polymers are produced in processes in aqueous suspension in which the polymerization is continued until a vinyl chloride conversion ranging from 80 to 90% is achieved. Polycaprolactone and vinyl chloride can be fed in simultaneously, be metered continuously, or added batch-wise to achieve the desired polycaprolactone vinyl chloride ratio.

The quantity of polycaprolactone employed depends on the application of the final product. For typical applications of plasticized vinyl chloride polymer in which a Shore A hardness ranging from 75 to 85 is desired, the desired plasticity can be attained by incorporating 32 to 40% polycaprolactone by weight in the polymer. Preferably products are produced that have a PCL content ranging from 34 to 40% by weight, especially preferred from 35 to 39% by weight.

Vinyl chloride polymers which possess a greater Shore A hardness value than the polymers of the present invention require lower polycaprolactone concentrations and are described in Japanese applications JP 85/90208 and JP 84/161419, reported in Chemical Abstracts 104 (8), 51560f and Chemical Abstracts 102 (4), 25580b, in which polycaprolactone compositions of 30% and 11.3%, respectively, are reported.

The number average molecular weight Mn of polycaprolactone should be in a range between 10,000 and 60,000 daltons, preferably is 20,000 and 50,000 daltons, and especially preferred is 30,000 and 50,000 daltons. Best results and high graft success are obtained if a polycaprolactone with a narrow molecular weight distribution is employed. Such polymers can be obtained through ionic polymerization and are commercially available, such as, TONE® (Union Carbide) and CAPA® (Interox).

Suitable suspension stabilizers are those compounds that are conventionally added for vinyl chloride polymerization (as described, e.g., in the Plastics Handbook, ed. Becker, Braun; 2. Polyvinyl Chloride, H. Felger, Hanser Verlag, 1986, page 144 ff). Examples are cellulose ethers, partly saponified polyvinyl acetates, and gelatin derivatives. The suspension stabilizers are usually added in concentrations of 0.05 to 0.2% by weight, based on the monomer.

For the polymerization initiator, conventional oil soluble substances producing free radicals can be used, for example, acetyl cyclohexylsulfonyl peroxide, alkyl perneodecanoates, dialkyl peroxydicarbonates, dilauryl peroxide, azodiisobutyronitrile or alkyl perpivalates. The initiator can be added in concentrations of 0.01 to 2 wt.%, preferably 0.02 to 1 wt.%. If the vinyl chloride monomer is metered in, the initiator can optionally metered in in order to guarantee a uniform radical concentration.

As additional additives, pH buffers such as phosphates, ammonium salts, alkali carbonates and the like may be employed. Anti-scale agents and antioxidants can also be used.

The polymerization temperature should range from 40° to 70° C.

Such internally plasticized vinyl chloride polymers can be used in any of the applications in which plasticized poly vinyl chloride is used. Preferred applications are plasticized polyvinyl chloride components employed in medical applications, such as, blood bags, cather tubes, and dialysis tubing.

Other features of the invention will become apparent in the course of the following descriptions of exemplary embodiments which are given for illustration of the invention and are not intended to be limiting thereof.

All parts specified are parts by weight.

EXAMPLE 1

In a 40 liter stainless steel polymerization boiler equipped with an impeller agitator and a Pfaudler current disturber, 20,000 parts of water, 7,800 parts of vinyl chloride and 4,900 parts of polycaprolactone ($Mn=42,000$; $U=Mw/Mn-1=0.6$) were dispersed with 65 parts of 72% saponified polyvinyl acetate. Following addition of 10 parts of potassium dihydrogen phosphate as buffer and 16 parts of t-butyl peroxopivalate as initiator, the mixture was stirred first for one hour at room temperature and then the polymerization was initiated by heating to 55° C. Upon 85% conversion, the reaction was cooled to room temperature at a final pressure of 2 bar and then processed.

The product contained 39% polycaprolactone.

Table 1 presents the analytical data for this polymer and the test results of the pressed sheets made thereof.

To manufacture the pressed sheets, 100 parts of the product were homogenized with 1.5 parts of a Sn stabilizer arid 0.2 parts of a lubricant on the roller at 150° C. and then pressed at 180° C.

The sheets exhibited excellent transparency, smooth surfaces, low Shore A hardness and good elongation at break.

EXAMPLE 2

The procedure was the same as in Example 1, except that the quantities of vinyl chloride and initiator were fed in four equal parts, with recharging occurring after two, four and six hours. Here, too, the final product contained 39% polycaprolactone.

Table 1 presents the results of the analytical tests conducted with this polymer. The pressed sheets were manufactured according to a conventional formulation for medical applications.

The sheets exhibited excellent transparency, smooth surfaces, low Shore A hardness and very good elongation at break.

COMPARATIVE EXAMPLE 1

A blend of 65 parts of PVC (S 7054, Hüls AG) and 35 parts of polycaprolactone was homogenized with the additives used in Example 1. In contrast to the processing of the polymer of Example 1, a roller temperature of 180° C. was used.

The resultant pressed sheets did not possess the transparency of Examples 1 and 2. Additionally, the Shore A hardness was too high.

The test results are presented in Table 1.

COMPARATIVE EXAMPLE 2

A blend of 81 parts of PVC and 39 parts of polycaprolactone was used. The resultant polymer was prepared in a conventional formulation for medical applications.

A roller temperature of 180° C. was employed for the homogenization. The resultant pressed sheets did not possess the transparency of Examples 1 and 2. In addition, the sheets became cloudy and lost their flexibility after a short period of time as a result of the crystallization of the polycaprolactone.

The test results are presented in Table 1.

COMPARATIVE EXAMPLE 3

A conventionally plasticized compound was prepared by mixing 63 parts of standard PVC (S 7054, Hüls AG) and 37 parts of the monomeric plasticizer dioctyl phthalate (DOP), adding the conventional medical additives employed in Example 2.

The analytical test results are presented in Table 1. The pressed sheets show the expected low Shore A hardness of a plasticized PVC. However, compared to Examples 1 and 2, the significantly lower elongation at break is striking. Moreover, the results of the extraction test show clearly the disadvantageous leaching that occurs with monomeric plasticizers; from 100 g of material 25 g was extracted; the remaining residue was brittle.

Obviously, numerous modifications and variations of the present invention are possible in light of the above teachings. It is therefore to be understood that within the scope of the appended claims, the invention may be practice otherwise than as specifically described herein.

TABLE 1

|  | Example 1 | Example 2 | Comp. Example 1 | Comp. Example 2 | Comp. Example 3 |
| --- | --- | --- | --- | --- | --- |
| composition |  |  |  |  |  |
| PVC (%) | 61 | 62 | 65 | 61 | 63 |
| PCL (%) | 39 | 39 | 35 | 39 |  |
| DOP (%) |  |  |  |  | 37 |
| processing temperature (°C.) | 150 | 150 | 180 | 180 | 150 |
| Shore A | 82 | 77 | 87 | 82 | 75 |
| elongation at break (%) | 560 | 580 | 415 | 430 | 340 |
| transparency* (%) | 63.0 | 63.7 | 60.0 | 20.8 becomes cloudy | 65.1 |
| visual evaluation of the surface | good | good | fish eyes | fish eyes | good |
| extractable proportions (Soxhlet, IPA**), 6 hours) (%) | <2 | <2 | 4 | 4 | 25 |
| percentage that can be precipitated with IPA from tetrahydrofuran*** (%) | 94 | 95 | 64 | 62 | 63 |

*transparency of a 6 mm thick pressed sheet at 546 nm
**isopropanol
***corresponds to PVC or PVC/PCL graft copolymer

What is claimed as new and desired to be secured by letters patent of the United States is:

1. An internally plasticized vinyl chloride polymer which can be processed into finished parts having a high transparency and excellent stability to extraction, produced by a process in which vinyl chloride is polymerized in the presence of polycaprolactone and wherein the internally plasticized vinyl chloride polymer has a polycaprolactone content ranging from 32 to 40% by weight, wherein the polycaprolactone consists of lactone units and has a number average molecular weight $M_n$ ranging from 10,000 to 60,000, with a narrow molecular weight distribution.

2. The internally plasticized vinyl chloride polymer of claim 1 wherein the polycaprolactone content ranges from 35 to 39% by weight.

3. A process for preparing an internally plasticized vinyl chloride polymer comprising polymerizing vinyl chloride in the presence of polycaprolactone consisting of lactonlactone units and having a number average molecular weight $M_n$ ranging from 30,000 to 50,000 with a narrow molecular weight distribution, wherein the polycaprolactone is added in such quantities that the internally plasticized vinyl chloride polymer has a polycaprolactone content ranging from 32 to 40% by weight.

4. The process of claim 3, wherein the polycaprolactone content ranges from 35 to 39% by weight.

5. The process of claim 3, wherein the entire vinyl chloride is added at the start of the polymerization.

6. The process of claim 3, wherein a portion of the vinyl chloride is introduced and the remainder is subsequently added together with proportionate quantities of an initiator until a polycaprolactone content ranging from 32 to 40% by weight is achieved.

7. The process of claim 6, wherein the polycaprolactone content ranges from 35 to 39% by weight.

* * * * *